(12) United States Patent
Gross

(10) Patent No.: US 7,607,918 B2
(45) Date of Patent: Oct. 27, 2009

(54) METHOD AND SYSTEM FOR SPATIAL, APPEARANCE AND ACOUSTIC CODING OF WORDS AND SENTENCES

(75) Inventor: Markus Gross, Uster (CH)

(73) Assignee: Dybuster AG, Zurich (CH)

(*) Notice: Subject to any disclaimer, the term of this patent is extended or adjusted under 35 U.S.C. 154(b) by 535 days.

(21) Appl. No.: 11/139,279

(22) Filed: May 27, 2005

(65) Prior Publication Data

US 2006/0286514 A1    Dec. 21, 2006

(51) Int. Cl.
*G09B 5/00* (2006.01)

(52) U.S. Cl. .......................... 434/169; 341/50; 704/9; 704/200

(58) Field of Classification Search ................ 434/118, 434/156, 167, 169, 353; 704/240, 256, 9; 341/55, 65, 107
See application file for complete search history.

(56) References Cited

U.S. PATENT DOCUMENTS

| | | | | |
|---|---|---|---|---|
| 4,718,087 A | * | 1/1988 | Papamichalis | ............... 704/222 |
| 5,510,981 A | * | 4/1996 | Berger et al. | .................. 704/2 |
| 5,614,899 A | * | 3/1997 | Tokuda et al. | ................. 341/51 |
| 5,651,095 A | | 7/1997 | Ogden | |
| 6,223,150 B1 | * | 4/2001 | Duan et al. | ..................... 704/9 |
| 7,036,075 B2 | * | 4/2006 | Walker | ....................... 715/201 |

FOREIGN PATENT DOCUMENTS

| | | |
|---|---|---|
| WO | 00/30071 | 5/2000 |
| WO | 00/60560 | 10/2000 |

OTHER PUBLICATIONS

Meng, H.M., et al.; "Phonological Parsing for Reversible Letter-to-Sound/Sound-to-Letter Generation"; Acoustics, Speech, and Signal Processing, 1994; ICASSP-94.; 1994 IEEE International Conference on Adelaide, SA, Australia Apr. 19-22, 1994; New York, NY, USA, IEEE. vol. 11, Apr. 19, 1994; pp. II-1 through II-4; XP010133941.

\* cited by examiner

*Primary Examiner*—Kathleen Mosser
*Assistant Examiner*—Jerry-Daryl Fletcher
(74) *Attorney, Agent, or Firm*—Philip H. Albert; Townsend and Townsend and Crew, LLP

(57) ABSTRACT

A method encodes a word or words. A sequential input string of symbols representing a word or a plurality of words is parsed into segments. A graph is constructed having spatial levels, each level including nodes. The segments of the input string are mapped to the nodes according to the levels and attributes are assigned to the nodes according to the segments, where an entropy of the word or plurality of words is a constant times an entropy of the graph and of the nodal attributes.

16 Claims, 8 Drawing Sheets

100

| Language | a | b | c | d | e | f | g | h | i | j | k | l | m |
|---|---|---|---|---|---|---|---|---|---|---|---|---|---|
| English | 8.04 | 1.53 | 3.09 | 3.97 | 12.5 | 2.31 | 1.94 | 5.43 | 7.28 | 0.16 | 0.65 | 4.13 | 2.54 |
| German | 6.44 | 1.93 | 2.68 | 4.83 | 17.5 | 1.65 | 3.06 | 4.23 | 7.73 | 0.27 | 1.46 | 3.49 | 2.58 |
|  | n | o | p | q | r | s | t | u | v | w | x | y | z |
| English | 7.09 | 7.59 | 2.01 | 0.11 | 6.12 | 6.54 | 9.26 | 2.71 | 1.00 | 1.88 | 0.20 | 1.72 | 0.09 |
| German | 9.84 | 2.98 | 0.96 | 0.02 | 7.54 | 6.83 | 6.13 | 4.17 | 0.94 | 1.48 | 0.04 | 0.08 | 1.14 |

Figure 3

| Color Code | | | Pitch | Color Code | | | Pitch |
|---|---|---|---|---|---|---|---|
| A/a (red) | G/g (red) | V/v (red) | Ä/ä (red) | C | E/e (green) | K/k (green) | U/u (green) | Z/z (green) | G |
| F/f (aqua) | Q/q (aqua) | R/r (aqua) | Ö/ö (aqua) | D | I/i (purple) | O/o (purple) | S/s/ß (purple) | Y/y (purple) | A |
| C/c (yellow) | M/m (yellow) | P/p (yellow) | Ü/ü (yellow) | E | B/b (blue) | H/h (blue) | N/n (blue) | | H |
| L/l (black) | X/x (black) | T/t (black) | | F | D/d (orange) | J/j (orange) | W/w (orange) | | C |

Figure 4

| d-t | b-p | k-g | a-h | m-n | g-e | c-z | f-v |

METHOD AND SYSTEM FOR SPATIAL, APPEARANCE AND ACOUSTIC CODING OF WORDS AND SENTENCES

FIELD OF THE INVENTION

The present invention relates generally to language processing and more particularly to encoding words and sentences for language acquisition.

BACKGROUND OF THE INVENTION

Dyslexia is an inherent inability of otherwise average or above average intelligent humans to read fluently and/or to write words and sentences in an orthographically correct form. The socio-economical implications of dyslexia are significant and often devastating for the individual, who, in many cases, dramatically underperforms in school and profession.

Dyslexia occurs predominantly in Western world languages, including English, Spanish, German, or French. It is estimated that up to 10% of the population of the Western world suffers from minor or major forms of dyslexia, see Snowling "*Developmental Dyslexia: A Cognitive Developmental Perspective*," Aaron, Malatesha Eds., Reading and Writing Disorders in Different Orthographic Systems, Kluwer Academic Publishers, pages 1-23, 1989.

Dyslexia appears in various forms, such as deep or surface, and developmental or acquired dyslexia, and at different levels of severity and strength. There are multiple causes for dyslexia, which are not fully understood. For instance, dyslexia can appear as a result of brain damage after an accident or stroke. Most often, however, dyslexia develops in early childhood and adolescence, see Denckla "*A Neurologist's Overview of Developmental Dyslexia*," Temporal Information Processing in the Nervous System", Talal et al. Eds., Annals of the New York Academy of Sciences, Volume 682, pages 23-26, 1993.

The irregularities in cerebral information processing underlying dyslexia are not fully understood, and are a subject of intensive research. There are various models for the acquisition of human reading and writing skills. It is widely believed that orthographically correct writing is acquired over three phases, a visual phase, a phonetic phase and a final semantic phase, see Reitsma "*Orthographic Memory and Learning to Read*," Aaron, Malatesha Eds, Reading and Writing Disorders in Different Orthographic Systems, Kluwer Academic Publishers, pages 51-74, 1989.

A commonly employed theory for reading is a dual route model, which distinguishes between a phonological and a lexical route, see Coltheart "*Lexical Access in Simple Reading Tasks*," Underwood, Editor, Strategies of Information Processing, pages 151-216, Academic Press, New York, 1978. However, that model does not provide a precise mathematical or procedural description of the disability, nor does it provide a therapy.

More recently, connectionist approaches, based on neural networks, attempt to explain language acquisition and dyslexia, see Seidenberg, McClelland "*A Distributed Developmental Model of Word Recognition and Naming*," Psychological Review, Volume 96, Number 4, pages 523-568, 1989, and Harm, Seidenberg "*Phonology, Reading, Acquisition, and Dyslexia: Insights from Connectionist Models*," Psychological Review, Volume 106, Number 3, pages 491-528, 1999. There, neural networks were successfully trained to mimic word learning and spelling. However, there was no description based on the theory of information and coding. Further, no therapy for lessening the effects of dyslexia was described.

Correlations between the occurrence of dyslexia and temporal information processing in the human brain was described by Wolff in "*Impaired Temporal Resolution in Developmental Dyslexia*," Temporal Information Processing in the Nervous System, Annals of the New York Academy of Sciences, Volume 682, pages 87-103, 1993. In particular, he suggested that dyslexia is a symptom of an inherent weakness in the brain for the processing of visual-temporal and visual-sequential, information—as opposed to visual-spatial perception, which is fully or often overdeveloped in dyslexic people. It was also observed by Overly et al. in "*Dyslexia and Music: Measuring Musical Timing Skills*," Dyslexia, John Wiley & Sons Publisher, Volume 9, Number 1, pages 18-36, 2003, that dyslexic children often develop difficulties in accurate or rapid musical timing. It has been hypothesized that musical training may be a remedy for such timing difficulties.

Numerous therapies of dyslexia have been described and applied in the prior art. Those treatments have mostly been developed in experimental psychology and require extensive work and regular sessions. None of the prior art utilizes a precise mathematical model of the information underlying words and sentences, or can quantify the information recoded for spatial perception.

Prior art computer-based exercises link words to their semantics and to pictorial information to support orthographic memory of a patient. Such methods, however, are limited to concrete words with obvious semantics or pictorial correspondence, such as "house". Those methods are of limited use for abstract words, such as "nonetheless".

Another prior art method represents words as 3-dimensional objects or scenes sculpted by a patient using deformable modeling mass such as clay, see Davis, Braun "*The Gift of Dyslexia: Why some of the Smartest People Can't Read and How They Can Learn*," The Berkeley Publishing Group, 1994.

There are also commercially available systems that provide methods to learn orthography using a computer. The systems present words using pictures and/or sound, however, none of those methods are based on information theory.

Therefore, there is a need for a method for language acquisition to provide therapy for dyslexia that overcomes the problems of the prior art.

SUMMARY OF THE INVENTION

The invention is a method and apparatus for encoding a word or words. A sequential input string of symbols representing a word or words is parsed into segments. A graph is constructed having spatial levels, each level including nodes. The segments of the input string are mapped to the nodes according to the levels and attributes are assigned to the nodes according to the segments, where an entropy of the word or plurality of words is a constant times an entropy of the graph and of the nodal attributes.

BRIEF DESCRIPTION OF THE DRAWINGS

FIG. 3 is a table presenting probabilities of occurrence of symbols of the alphabets of English and German languages;

FIG. 4 is an appearance/color and acoustic table such as used in one embodiment of the invention for appearance encoding.

FIG. 5 is a table showing dyslexic letter pairs used to optimize an appearance code;

DETAILED DESCRIPTION OF THE PREFERRED EMBODIMENTS OF THE INVENTION

Notational Conventions

For convenience, the following are notational conventions used herein.

Sets are denoted by capital letters, and elements of a set are denoted by smaller capital letters.

A language is a systematic means of communicating by the use of sounds or conventional symbols. Examples are English, German, and French.

A symbol or letter x is an atomic information unit, from which more complex structures of a language are built, such as words and sentences. Examples are a, b, c, d . . . .

An alphabet A is the set of N letters used in a specific language. An example is A={a, b, . . . , z, A, B, . . . Z} as utilized in English. Due to special characters, such as ö, ü, ä, é, è etc., the letters can vary in different languages.

A string $s=(s_1, \ldots, s_J)$ of length J is any random sequence of symbols $s_j$ from an alphabet. The string can include special symbols, such as "-" or a space, to separate substrings. Examples are "Uni-ted States pa-tent off-ice", but also "sgsjilsgf-gsfg". Special strings can be a single word, multiple words, or sentences.

A word w is a string that uses symbols of an alphabet of a language and which, for this language, has a specific semantics. "Attorney" is a word in the English language, but not a word in German language.

A syllable y is a substring of a word $w=(y_1, \ldots, y_K)$. Words can be hyphenated into syllables. As an example, the English word "lan-guage" includes two syllables.

A sentence S is a sequence of words, separated by blank symbols ""(a space) and finished by a full stop symbol '.'.

A graph G(V,E) is a geometric structure including a set of edges E and a set of nodes V.

An appearance map c(x) is a function, which maps each symbol x of A onto a vector of appearance values c, where c belongs to the set $\{c_1, \ldots, c_C\}$.

An audio map m(x) is function which maps each symbol x of an alphabet A onto a vector of audio attributes m, where m belongs to the set $\{m_1, \ldots, m_M\}$. In the preferred embodiment, audio attributes are musical tones.

System Structure and Method Operation

Figure 1:
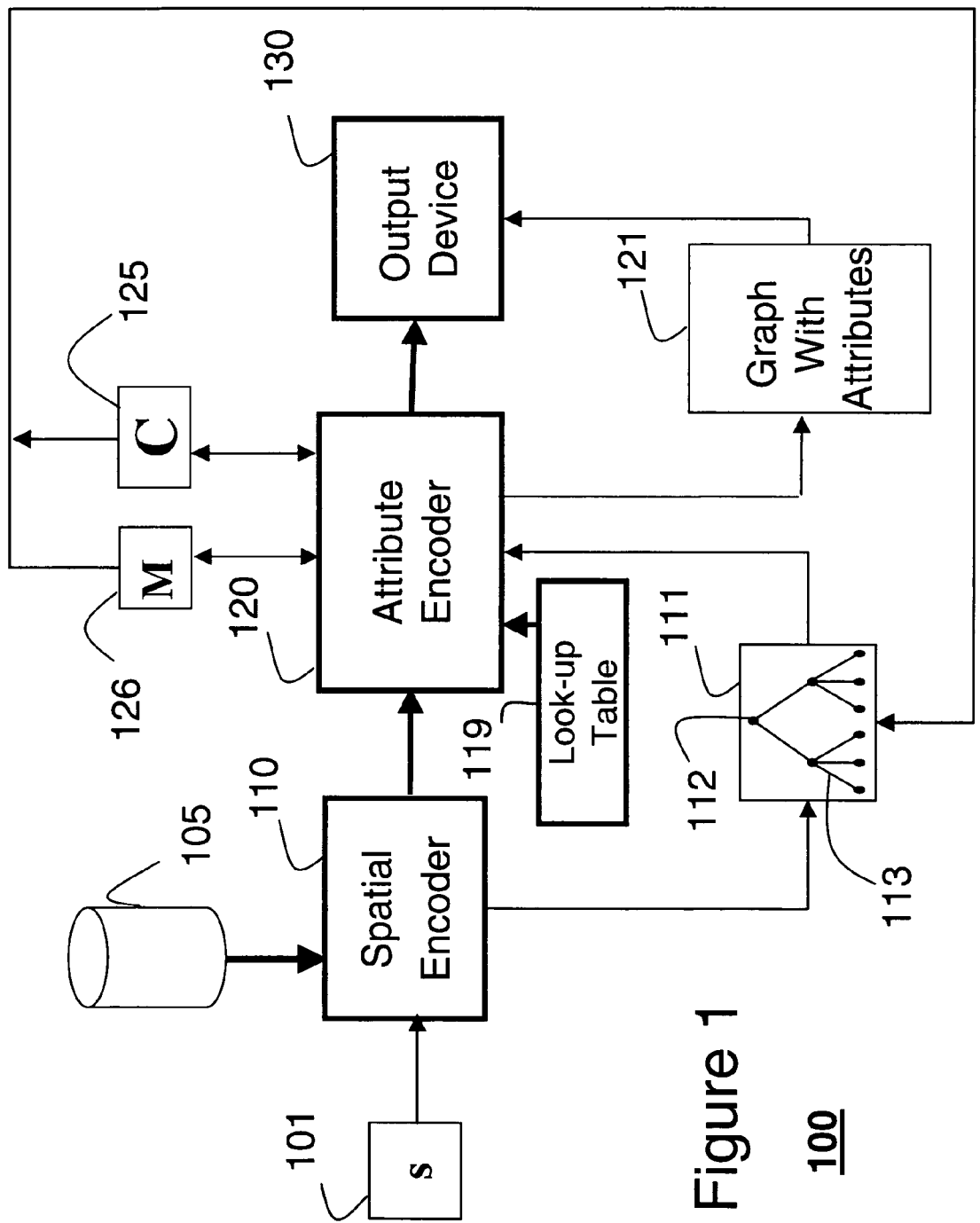
FIG. 1 is a block diagram of a system and method for representing a word using spatial, appearance, and acoustic recoding.

FIG. 1 shows a structure 100 of a system for spatial recoding of words according to one embodiment of the invention. The system includes a spatial encoder 110 connected to an attribute encoder 120. The spatial encoder 110 takes as input a sequential string s 101 of symbols, which can be one or more words. The spatial encoder 110, parses the input string s 101 and constructs a graph 111 including nodes 112 connected by edges 113. The nodes of the graph 111 correspond to individual words, syllables, and letters of the input string s 101. In one embodiment of the invention, the graph is in the form of a hierarchical tree.

As an advantage, the spatial encoding can be performed automatically using hyphenation methods see Knuth "The TeXbook", *Addison Wesley Publishing Company*, chapter H, 1986. As an alternative, hyphenation can be provided manually by user input. Optionally, a dictionary 105 stored in a database can support the parsing of the input string s 101.

Next, a set of attributes is assigned to the nodes 112 of the graph 111 by the attribute encoder 120. The attributes can be appearance attributes C 125 or audio, e.g., musical, attributes M 126. Appearance attributes 125 include color, texture, material parameters, or shape of the symbols assigned to the nodes of the graph 111. Other appearance attributes that change over time, e.g., animations, are also possible. In one embodiment of our invention, these attributes are assigned using a look-up table 119. The look-up table can be generated in a preprocessing step.

The audio attributes M 126 can be assigned to the nodes of the graph 111 by the attribute encoder 120. In the preferred embodiment, the audio attributes described below, include pitch, volume, scale, rhythm, and style. However, it should be understood that other audio attributes, i.e., any sounds, can also be used The attributed graph 121 can be displayed on an output device 130. The output device can produce visual or acoustic signals, depending on whether appearance coding, audio coding, or both are used.

Thus, visual-sequential information, represented by the string, is encoded into visual-spatial, appearance and acoustic information, which circumvents the inherently weak serial cognitive cue of a dyslexic human and utilizes spatial, visual, and auditive cues instead.

By quantifying the information encoded according to the invention, an amount of information passed to a user can be measured and precise control over a learning rate can be achieved. As will be described below, the invention employs information theory and statistical modeling to measure the information.

The spatial coder transforms the input symbol string into a spatial structure, the graph G, and the attribute encoder assigns appearance and/or acoustic attributes to nodes of the graph. Thus, it becomes possible to convey the information embedded in the string s via different routes and pathways, i.e., audio and/or visual pathways, into the human brain using the output device 130.

Spatial Representation Text Strings

Figure 2:
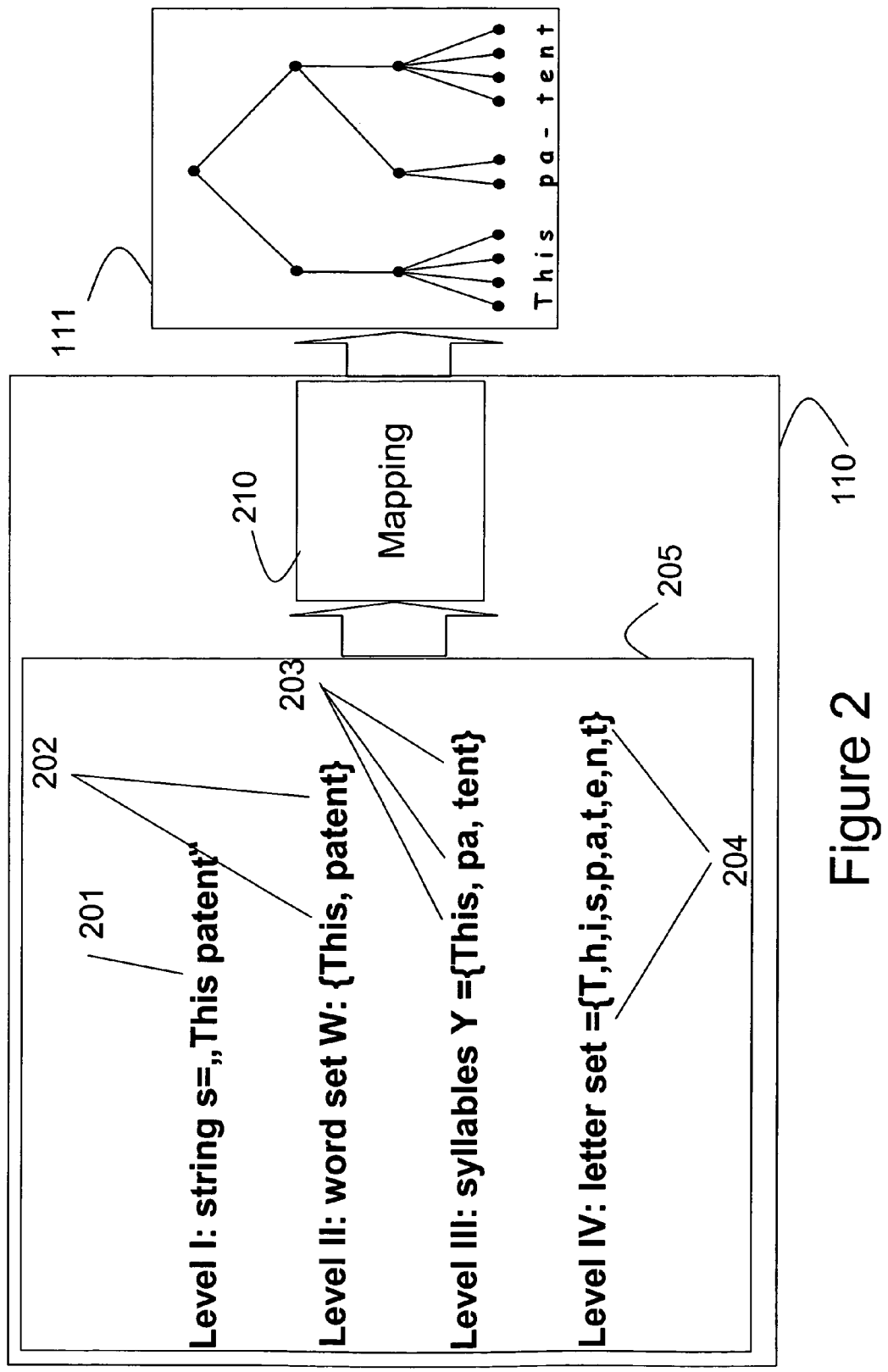
FIG. 2 is a block diagram of individual processing stages of a spatial recorder including a hierarchical decomposition of an input string of words.

FIG. 2 shows the spatial encoder 110 in greater detail. As describes above, the encoder parses 205 the input string s 101. Symbols of the parsed string are mapped 210 onto the graph G 111, which includes nodes V and edges E, hereinafter G(V,E). The mapping 210 is surjective, and two strings $s_a$ and $s_b$ can be mapped onto the same graph G. One embodiment of our invention uses a planar, hierarchical tree. Other graphs, such as DAGs and non-planar graphs are possible. The topology of the tree is specified as follows:

One embodiment of the invention uses a four-level hierarchy: The string s at level I 201 is recursively decomposed into a set of words W at level II 202. Each word $w_m$ is decomposed into a set of syllables $Y_m$ at level III 203. Each syllable $Y_{km}$ is decomposed into a set of letters $L_{km}$ at level IV 204. This recursive decomposition is performed by a parser 205. In a second stage, the graph G(V,E) 111 is generated from this decomposition by connecting hierarchically all parent nodes to their child nodes. As an example, we use the string s="This pa-tent". Individual levels of the hierarchy can be omitted. New ones can be added, such as for instance, a level for phonemes.

In one embodiment of our invention, the two spatial encoding stages 205-210 are performed according to the following steps:

Detect all "space" characters in input string s. These space symbols separate words $w_m$ from each other.

Segment string s into partial strings each representing a word $w_m$.

Hyphenate each partial string $w_m$ by inserting the symbol "-" using a hyphenation process.

Partition each syllable into individual letters.

Connect hierarchically parent nodes to child node.

Alternatively, a user can insert hyphens in the input string manually. Different flows are also possible. For example, a level can be omitted.

Entropy Encoding of Strings

For encoding strings, assume that any string s, i.e. a word or a sentence, is a random sequence of letters x. Thus, x can be considered as a value of some random variable X representing a stochastic process. This random process can be characterized as a Markovian process of order O. This Markov process is fully characterized by the conditional state transition probabilities P, see Cover, Thomas "Elements of Information Theory," John Wiley & Sons Publisher, New York, 1991.

One embodiment of the invention utilizes a zero-order Markov process, which is fully described by the probabilities of occurrence $P(x_i)$ of symbol $x_i$ with $$P_X(x_i) = P(x_i) = P(X=x_i).$$

In this model, the occurrence of a symbol $x_i$ is statistically independent of preceding symbols. This is a simplifying assumption for human speech. Higher order Markov models, using di-gram or tri-gram probabilities, are also possible.

The probability $P(x_i)$ is a statistical descriptor of a language and is different for each language. It is assumed that in any language, each symbol of its alphabet has a distinct probability of occurrence. For instance P("e") is 12.5% for English and 17.5% for German. This statistic is well researched and can be found in tables, such as the one shown in FIG. 3. The set of admissible symbols is defined in the alphabet A of the language. A distinction of small capital and large capital letters is also possible. For example, in German, all nouns are capitalized.

The random source process X can be considered as an information source. To measure this information, we use a novel application of an entropy H. The concept of entropy is described by Shannon "The Mathematical Theory of Information," University of Illinois Press, Urbana, 1949. In prior art, the concept of entropy has frequently been used to compress text, see Bell et al. "Text Compression," Prentice Hall, New Jersey, 1990.

The entropy H generally quantifies the information of the random source process X, measured in bits. The entropy H represents a lower bound for the encoding of symbols of the process X. The entropy H can also be used to measure the entropy rate of the associated Markov source, that is, the average number of bits needed to encode a single symbol x.

Let N be the number of symbols in A, and assuming a Markov-0-model, we obtain the entropy rate of X as:

$$H_x = -\sum_{i=1}^{N} P(x_i) \log P(x_i),$$

in bits/symbol. In this model, the entropy rate for English is about 4.17 bits/symbol, for German 4.07 bits/symbol, and for French 3.98 bits/symbol, depending on the tables used.

In order to encode a given string s 101 by means of a graph G(V,E), and a set of appearance attributes C, and/or a set of acoustic attributes M, an information of input string s 101 is measured, assuming that the string s is a random sequence described by a Markov-0 model.

Let the string $s=(s_1, \ldots, s_J)$ be a random sequence of symbols $s_j$ of length J. The joint probability of s is given by $$P(s) = \prod_{j=1}^{J} P(s_j),$$

where the function $P(s_j)$ represents the probability of occurrence of symbol $x=s_j$ in the alphabet A.

It should be noted that this approximation only holds on average. It is, however, sufficient, because the human brain is exposed to very large sequences of textual information, which have to be learned and processed. This justifies the use of statistical considerations over long, averaging intervals.

Spatial Coding

The information of the spatial encoder 110 can be measured using fundamental concepts from graph compression.

This embodiment of our invention utilizes a special kind of graph, a so-called tree. In the prior art, see Benoit et al. "Representing Trees of Higher Degree," Dehne et al. Eds., WADS 1999 Proceedings, pages 169-180, Springer Publishing Company, Berlin, 1999, it has been shown that a tree T(V,E) with V nodes and E edges can be encoded in 2(V+1) bits, where V is the number of nodes.

A simple example of a 2 bits/node encoding exploits the correspondence of trees with V nodes and strings with 2V parentheses, e.g. { { { { } { } } { } } }.

To keep the following description simple, we confine the analysis to single words $w=(s_1, \ldots, s_J)=(y_1, \ldots, y_K)$ with J letters and K syllables only, where J>=K. An extension to general strings s is straightforward.

To encode the levels II, III and IV according to FIG. 2 use 2(J+K+1) bits.

Let $P_y(K|J)$ be the conditional probability that a word w of length J includes K syllables and let $P_w(J)$ be the probability that the word w is J symbols long. For the spatial encoding of a word w of J symbols and K syllables use, on an average, $$H_t = \sum_{K=1}^{\max(K)} \sum_{J=1}^{\max(J)} 2 P_w(J) P_y(K|J)(J+K+1)$$

bits, where max(K) is the maximum number of syllables in a language and max(J) is the maximum length of a word in a language. These probability distributions are characteristic for each language, and are different for English, German, and French.

For English, we utilize max(K)=10 and max(J)=25. Other values are possible.

For the purpose of this invention, approximate the function $P_w(J)$ using a discrete Poisson distribution of type $$P_w(J) = \frac{e^{-\mu_w} \mu_w^J}{J! \sum_{J=1}^{\max(J)} P_w(J)},$$

with the mean $\mu_w$ being a user defined parameter, and where the sum in the denominator normalizes the distribution.

A similar approximation is utilized for the function $P_y(K|J)$, where we assume $$P_y(K|J) = \begin{pmatrix} 0, K > J \\ P_y((K), \text{else}) \end{pmatrix},$$

and a discrete Poisson distribution for the function $P_y(K)$, $$P_y(K) = \frac{e^{-\mu_y} \mu_y^K}{K! \sum_{K=1}^{\max(K)} P_w(K)}.$$

Other probability distributions, such as Gaussian distributions, are possible.

For English, $\mu_w = 4.5$ and $\mu_y = 1.7$, whereas for German $\mu_w = 6.5$ and $\mu_y = 1.7$. Other values are possible depending on the training corpus used for the statistical analysis.

The discrete distribution $P_y(K)$ provides us a means to compute the syllable entropy $H_y$, i.e., an average minimum number of bits to encode the number of syllables of a word in level III 203 of FIG. 2.

$$H_y = -\sum_{K=1}^{\max(K)} P_w(K) \log P_w(K).$$

In the model of the preferred embodiment of this invention, determine the entropy $H_y = 2.0$ bits for both languages.

Appearance Coding

In the context of our invention, appearance is understood as any aspect that enables the human visual system to distinguish two otherwise similar objects. Hence, appearance attributes include in particular: color and transparency; reflection and surface microstructure; texture; simple shapes, such as spherical, cylindrical, conical; shapes with specific semantics, such as banana, apple, peach; and changes thereof over time, denoted as animations.

In order to encode level IV in FIG. 2, the attribute encoder 120 selects, for each symbol x of w, a vector of appearance attributes c. In the preferred embodiment of our invention, the mapping c(x) is surjective and maps the symbol set to fewer sets of appearance attributes.

The mapping can be realized by a code table lookup or programmatically. An example for such a code table, as used by the preferred embodiment of our invention, is shown in FIG. 4. In this embodiment, the alphabet of the German language including special characters, such as 'ä', 'ö', 'ü' is mapped onto 8 distinct colors. Other tables are possible in other embodiments of the invention. A process to construct this table is described in greater detail below.

For the following analysis, we consider the appearance attributes and confine the appearance attribute to color values. An extension to general strings s and to more general appearance values is straightforward. Let c(x) be the appearance map which maps each symbol x onto a color vector c, where c belongs to the set $\{c_1, \ldots, c_C\}$. We compute the probability of occurrence of a color $c_k$ in the alphabet A by summing up over the probabilities of all symbols x mapped to $c_k$ $$P(c_k) = \sum_{i=1}^{N} P(x_i | (c(x_i) = c_k)).$$

Likewise, the appearance entropy rate $H_c$ yields as $$H_c = -\sum_{k=1}^{C} P(c_k) \log P(c_k),$$

where C stands for the number of appearance attributes.

For the preferred embodiment of our invention, we assume that the entropy $H_c$ is maximized. This implies $$P(c_k) = \frac{1}{C} \Leftrightarrow H_c = \log C,$$

i.e., a uniform distribution of $P(c_k)$.

Audio Encoding

In one embodiment of the invention, audio attributes are understood as any aspect of a musical event that enables the human auditive system to distinguish two, otherwise similar, musical events from each other. Such attributes include in particular: Pitch and volume; scale of a melody; rhythm, length, and reverb; style elements, such as warblers, syncopes; chords and harmony, and changes thereof over time.

In order to encode level IV in FIG. 2, the attribute encoder 110 selects, for each symbol x of w, a set of musical attributes m. In the preferred embodiment of our invention, the mapping m(x) is surjective and maps the symbol set to fewer sets of musical events.

Similar to the case of appearance, this mapping can be realized by a code table lookup or programmatically. An example for pitch values is given in FIG. 4 as well.

For the following analysis, only the pitch values are considered. An extension to more general musical attributes is straightforward.

Let m(x) be the musical mapping which maps each symbol x onto a musical vector m, where m belongs to the set $\{m_1, \ldots, m_M\}$. The number of pitch values is equal to M. Determine the probability of occurrence of a pitch $m_k$ in the alphabet A by summing up over the probabilities of all symbols x mapped to $m_k$ $$P(m_k) = \sum_{i=1}^{N} P(x_i | (m(x_i) = m_k)).$$

Likewise, the musical entropy rate $H_m$ yields as $$H_m = -\sum_{k=1}^{M} P(m_k) \log P(m_k).$$

Similar assumptions regarding the uniform distribution of $P(m_k)$ are possible to obtain $$P(m_k) = \frac{1}{M} \Leftrightarrow H_m = \log M.$$

Overall Entropy of the Recoding

The invention recodes the sequential information of the word w into spatial information 111, having appearance and/or musical information 121 by means of entropy. In order to determine the parameters of the model, the overall entropy $H_w$ of a word in a given alphabet A, i.e., the average number of bits needed to encode this word, is determined. This accomplished by summing up over the entropy rates of all possible word lengths multiplied with the word length probability:

$$H_w = \sum_{i=1}^{\max(J)} JP_w(J)H_x.$$

Similarly, we compute the overall color entropy $H_{cw}$ by multiplying the color entropy rate $H_c$ with the expected value of the word length distribution:

$$H_{cw} = H_c \Sigma_{J=1}^{\max(J)} JP_c(J) \approx \mu_w H_c$$

The overall musical entropy $H_{mw}$ can be computed the same way.

We assume that the overall recoding requires only $\lambda$ times the entropy of the word w, i.e., $H_t + H_{cw} + H_{mw} + H_y = \lambda H_w$ with a value $\lambda$ being a user defined constant. In case of uniform distributions of $P(c_k)$ and of $P(m_k)$, and assuming M=C, we compute the required number of color values as $$C = 2^{\frac{\lambda H_w - H_t - H_y}{2}}.$$

Note that $H_y=2.0$ is an optional term utilized in specific embodiments of this invention assigning additional colors to encode syllable lengths.

Appearance and Musical Maps

The appearance map c(x) and the musical map m(x), i.e., look-up tables 125-126, can be generated using an optimization method. We confine our description to the computation of the color table used in this embodiment of our invention. Extensions to more complex appearance attributes or to the musical map m(x) follow similar procedures.

Figure 5:
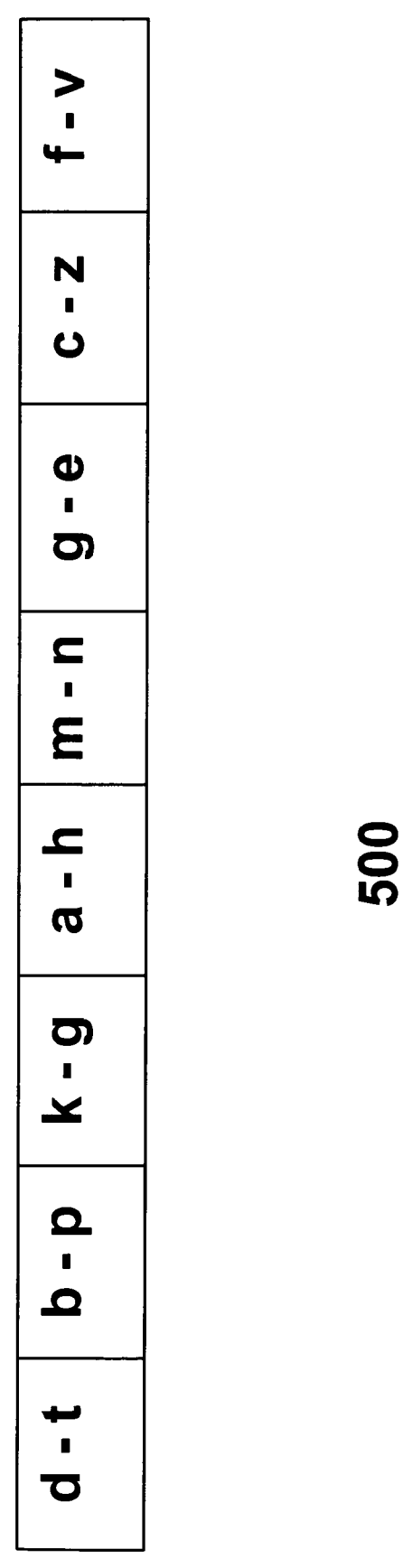

We first define a so-called dyslexic map $dys(x_i, x_j)$ of two symbols $x_i$ and $x_j$. This map takes a value of 1 for pairs of letters which are often swapped by dyslexics, and a value of 0 otherwise. It includes phonetically similar symbols, such as "e"-"d", as well as silent letters, such as "h". These pairs are widely known in dyslexia research. An example 500 of a map is presented in FIG. 5. Hence $$dys(x_i, x_j) = \begin{pmatrix} 1, & \text{if-dyslexic-pair} \\ 0, & \text{else} \end{pmatrix}.$$

The goal is to map such dyslexic symbol pairs onto appearance attributes with a large perceptual distance, denoted by the norm $\|.\|p$ This norm is described in greater detail below.

In the preferred embodiment of the invention, map, for instance, the pair "t"-"d" onto complementary colors black and white, respectively. To quantify the quality of the mapping, define a so-called dyslexic energy $E_D(x_i, x_j)$ for a pair of symbols $(x_i, x_j)$ with $$E_D(x_i, x_j) = \frac{dys(x_i, x_j)}{1 + \|c(x_i) - c(x_j)\|_p}.$$

Similarly, assign the color attributes to individual symbols in such a way that a distribution of $P(c_k)$ is uniform, i.e., that the probabilities of all colors are equal. To this end, define a so-called probabilistic energy $E_p(x_i, x_j)$ for a pair of symbols with $$E_p(x_i, x_j) = |P(c(x_i)) - P(c(x_j))|.$$

The overall energy E of a configuration is computed by summing over all possible symbol pairs. The mapping c(x) is determined by minimizing E, i.e., $$E = \sum_{j=1}^{N} \sum_{i=1}^{N} (E_D(x_i, x_j) + \alpha E_P(x_i, x_j)) \to \min,$$

with $\alpha$ being a user defined constant. Note that the minimization of the upper energy maximizes the appearance entropy $H_c$.

The minimization of the overall E is a discrete optimization problem, which is solved using simulated annealing. Kirkpatrick et al. "Optimization by Simulated Annealing,", *Science*, Volume 220, pages 671-680, 1983, describes simulated annealing for discrete optimization and to approximate NP-hard problems.

In the preferred embodiment of the invention, an appearance attribute $c_k$ is initially assigned to each symbol $x_i$ of the alphabet A. The initial assignment distributes all appearance attributes equally to all symbols. A discrete simulation time t is also assigned. In a next step, the energy E(t) is determined at time t, and two symbols $(x_i, x_j)$ are randomly selected. The appearance attributes of $(x_i, x_j)$ are then interchanged, the simulation time is incremented, and the energy E(t+1)I is determined again for the next time increment. If E(t)>E(t+1), then the interchange is rejected with an annealing probability $P_a$ of $$P_a(t) = 1 - e^{\frac{-t}{T}},$$

with T being a user defined annealing temperature parameter.

The optimization process can be described programmatically as follows:

assign all color attributes $c_k$ to all symbols $x_i$
set simulation time t=0
repeat:
Compute energy E(t);
Randomly pick pair $(x_i, x_j)$;
swap $(x_i, x_j)$;
increment t:=t+1;
compute $P_a(t)$;
recompute E(t+1);

-continued

```
if E(t) > E(t+1)
    swap (x_i,x_j) with P_a(t);    //swap back with P_a(t)
    if (t > t_max)
        break;
    else
        go to repeat;
    end;
        Color Attributes
```

The probabilistic energy $E_p(x_i, x_j)$ allows for the determination of a number C of required color/appearance values. In this embodiment of the invention, these colors values are determined in such a way that their minimum perceptual distance is maximized. This optimization guarantees all colors can be properly distinguished by the human visual system and that no two color values are too close to each other.

For reasons of simplicity, we describe the computation for the RGB color space. Other, perceptual color spaces, such as Yu*v*, Ya*b*, or YMS, are also possible, see Wyszecki "Color Science: Concepts and Methods, Quantitative Data and Formulae," John Wiley & Sons, 2nd Edition, 1982.

Let $c_k$ and $c_l$ be two color attributes with coordinates ($C_{kR}$, $C_{kG}$, $c_{kB}$) and ($C_{lR}$, $C_{lG}$, $C_{lB}$) in RGB-space respectively. Define the distance $d(c_k,c_l)$ as the Euclidean norm of the two color vectors, with $$d(c_k,c_l)=\|c_k-c_l\|=\sqrt{(c_{kR}-c_{lR})^2+(c_{kG}-c_{lG})^2+(c_{kB}-c_{lB})^2}.$$

Other norms are possible as well.

The computation of the C positions in color space involves the following optimization $$\max(\min(d(c_k,c_l)))\forall i, k.$$

Figure 6:
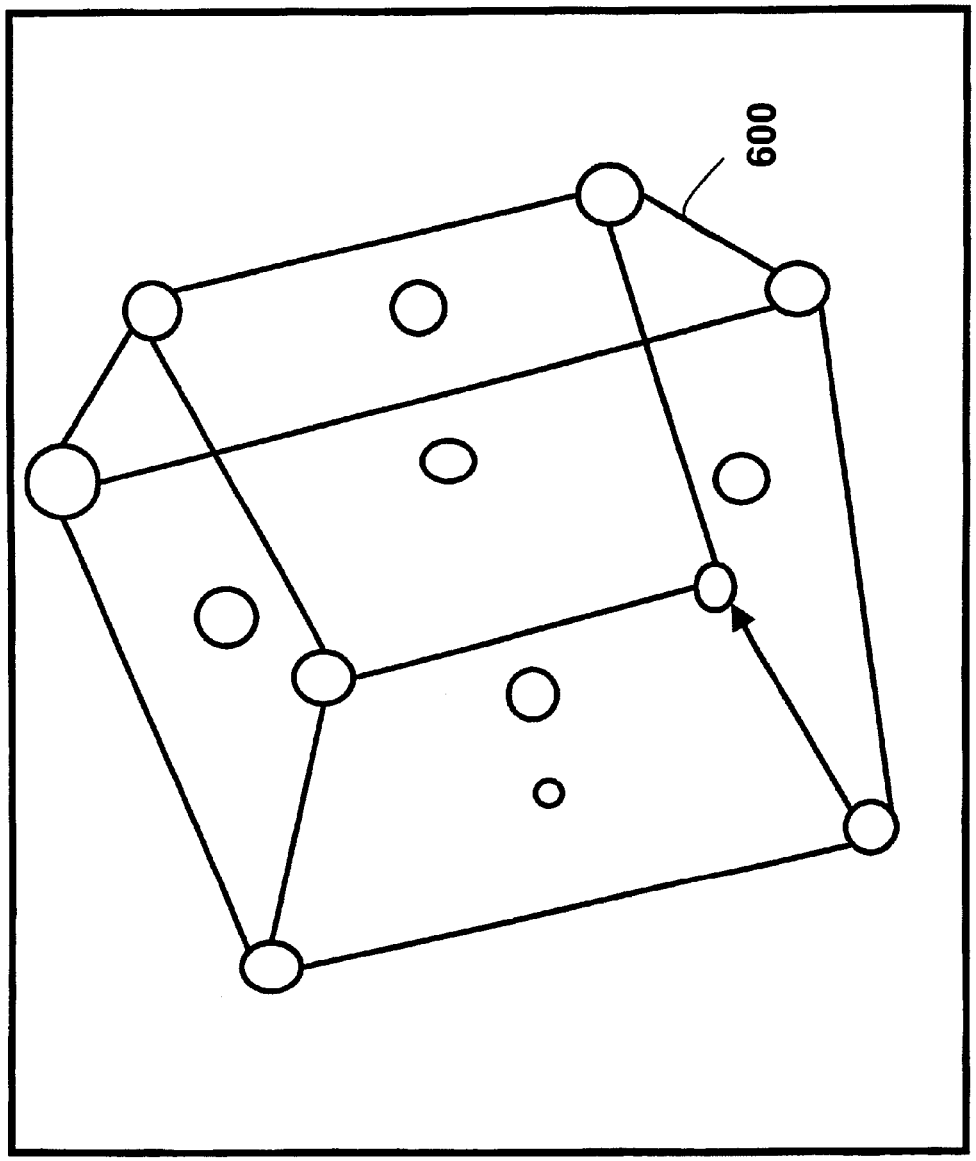
FIG. 6 is a block diagram of 12 color positions in RGB color space after optimization.

The optimization can be performed using a physically based simulation. To this end, assign a repulsive force to each particle and run the differential equation describing the system dynamics. An example 600 of an optimal configuration for C=14 in RGB-space is shown in FIG. 6. As can be expected, the resulting color positions are located on each vertex of the RGB cube as well as in the centers of each of the six faces. In this configuration the minimum distance between two positions is maximized.

Implementation Details

In the preferred embodiment of the invention the encoding is employed to support the learning and acquisition of languages with an emphasis on dyslexic users. The embodiment distinguishes between several learning and input modi. In modus I, the user learns the appearance and musical tables.

Figure 7:
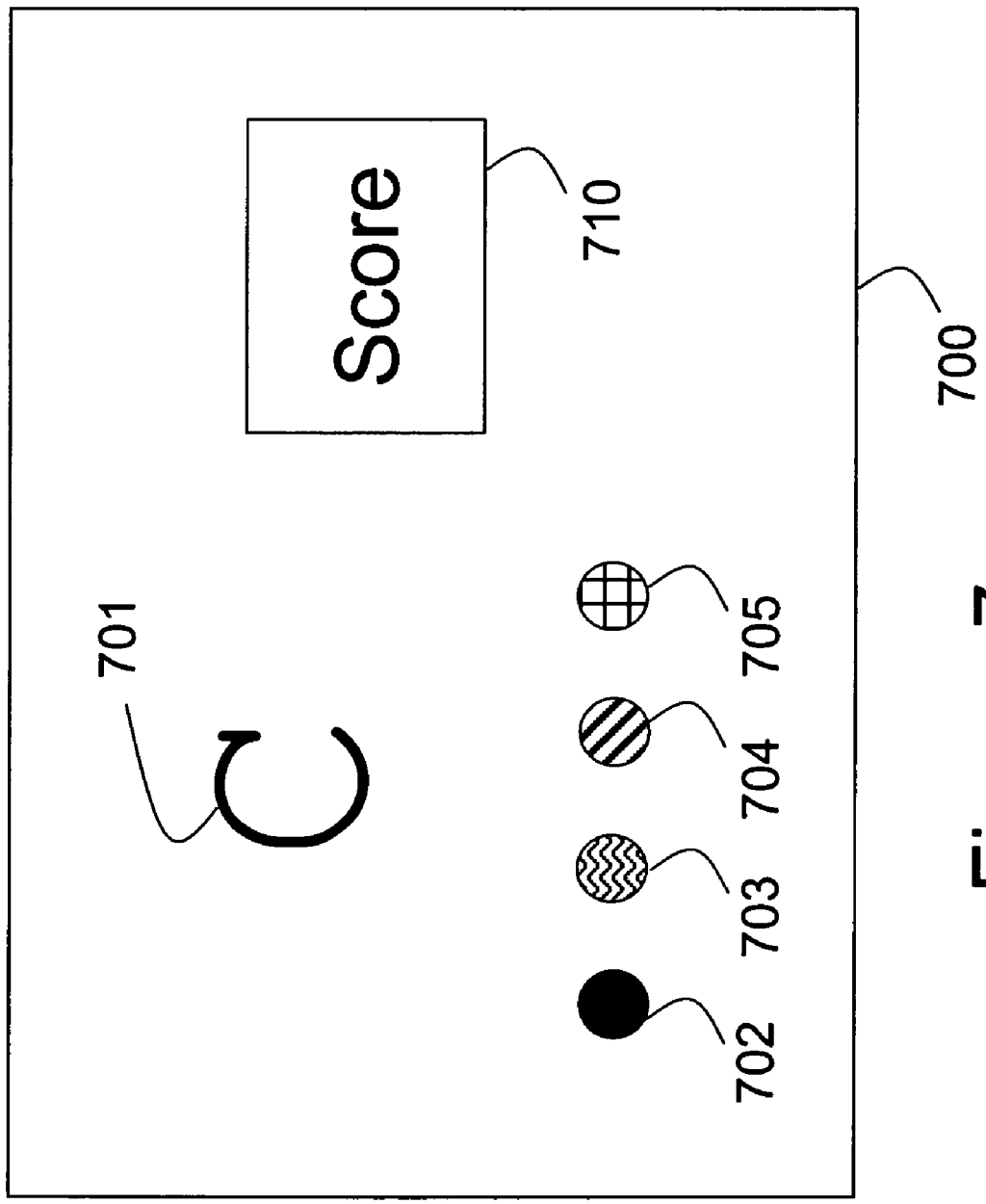
FIG. 7 is a schematic of a representation presented to a user for learning an appearance code.

This is accomplished by a color learning game 700, as shown in FIG. 7. The game selects symbols, e.g., "C" 701, from an alphabet A based on a prior error probability and presents them to the user who must confirm the corresponding color 702, from a set of colors 702-705. It should be understood that the different patterns shown for each of 702-705 each represent a different color.

As the user progresses, the color saturation of the presented symbol fades to white requiring the user to memorize the color. An acoustical signal or a musical event confirms the correct computer mouse click. A score counter 710 provides feedback to the user about his learning state, performance, and error rate. Other spatial arrangements of colors 702-705 are possible.

Figure 8:
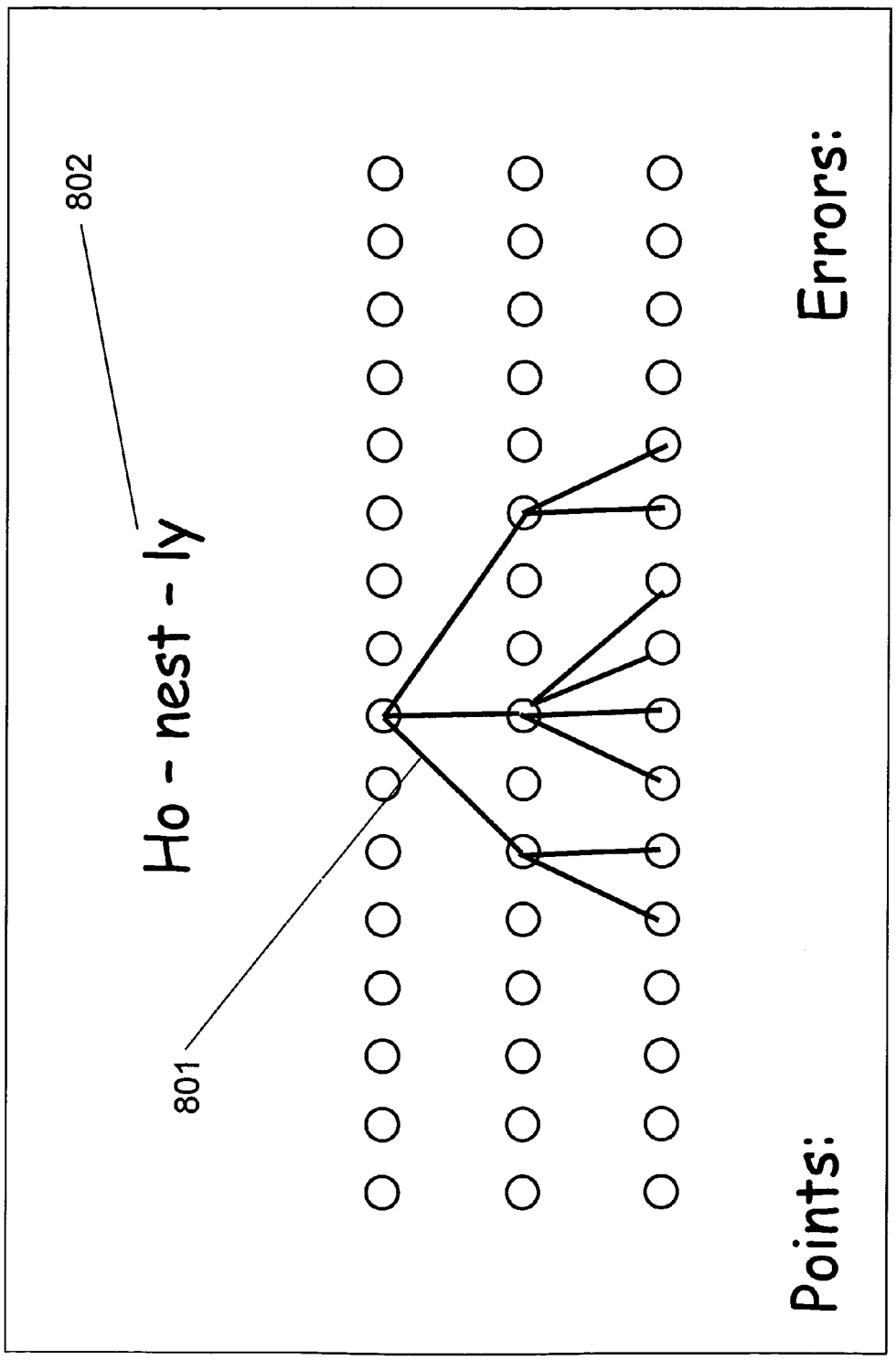
FIG. 8 is schematic of a representation presented to a user for learning the concept of spatial encoding.

Likewise, the user learns the concept of spatial encoding using a graph learning game, as shown in FIG. 8. In this game, the user must draw the correct tree 801 of a word 802 presented by the system by clicking arrays of nodes. The arrays of nodes can be stored in a computer readable medium used by the system in presenting the game. Acoustic signals and musical events confirm correct clicks. The words are taken from a database containing the most frequent words of a language. As an alternative, the user can create his own database by typing in new words through a keyboard and by recording his or her voice as a phonetic map. Other spatial arrangements are possible.

In learning mode the system displays the spatial and color codes of a word taken from the database. As an option, the system replays the musical events for each letter of the word according to the musical map. In addition, the system replays a previously recorded pronunciation of the word. Then, the user must type in the word through the keyboard. Upon each keystroke, an acoustic signal or musical event is displayed to indicate orthographic correctness. A score counter provides feedback on learning performance. Orthographic errors are tabulated and utilized to compute a word error probability and other performance measures. The system picks the word with the highest error probability for display.

In input mode, the user feeds new words into the database by typing them on a keyboard. A dictionary can optionally assist the user to automatically complete words and to check for correct spelling. In addition, an automatic hyphenation algorithm can hyphenate the word and thus create the spatial code.

As an alternative, the user can manually hyphenate the word by adding hyphen symbols, such as for instance "pa-tent". Optionally, articles or longer strings with a plurality of words can be processed as well.

After the word is completed, the system requests the user to speak and record the word using a digital voice recorder. The voice recording is stored digitally in the database. The system can be used in single or in dual language mode. In dual language mode, dictionaries for both languages can be utilized. The keys of the keyboard can be colored according to the color map of each symbol.

Although the invention has been described by the way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for training dyslexic students on improving reading skills using a computer-based system that is capable of displaying at least text from a training data set, the method comprising:

receiving the training data set as a sequence of symbols representing one or more words from the text of the training data set;

parsing the sequence of symbols into a set of segments, the segments representing one or more of words, syllables or letters;

generating a tree graph data structure, in a computer-readable medium, representing a tree graph having a plurality of spatial levels, each level including nodes, wherein child nodes in the tree graph correspond to segments of the set of segments, with nodes of a particular level corresponding to words, syllables or letters;

mapping attributes from a set of attributes to nodes of the tree graph, such that the sum of an entropy of the graph and an entropy of the set of attributes is a constant times an entropy of the one or more words; and displaying, to a dyslexic student, using a display device of the computer-based system, a representation of the sequence of symbols with the attributes visually represented, thereby providing additional display information beyond just the sequence of symbols usable to training on improving reading skills.

2. The method of claim 1, wherein the sequence of symbols represents a plurality of words and parsing produces segments representing each word in the plurality of words, and further comprising:
parsing each word into segments representing syllables; and
parsing each segment representing syllables into segments representing letters.

3. The method of claim 2, wherein the tree graph includes at least three layers, wherein a first layer includes a node for each word, a second layer includes a node for each syllable, and a third layer includes a node for each letter.

4. The method of claim 2, wherein the parsing is performed according to a characteristic distribution of a length of syllables and a length of words in a particular language.

5. The method of claim 1, wherein displaying the appearance attributes of the graph using the display device comprises displaying three-dimensional objects.

6. The method of claim 1, wherein the attributes include musical attributes, and the method further comprising outputting the musical attributes of the tree graph to an audio output device of the computer-based system.

7. The method of claim 6, wherein each musical attribute is mapped onto a symbol.

8. The method of claim 6, wherein an information of the musical attributes is using entropy.

9. The method of claim 6, further comprising maximizing the entropy of the segments to determine an optimal number of different musical attributes.

10. The method of claim 1, wherein the one or more words is a sequence of symbols of an alphabet.

11. The method of claim 1, wherein mapping further comprises quantifying information content of words using a Markov model of predefined order.

12. The method of claim 11, wherein the Markov model is a Markov-0-Model to measure entropy.

13. The method of claim 1, wherein the tree graph is a tree graph constructed using automatic hyphenation methods.

14. The method of claim 1, wherein mapping further comprises maximizing entropy of the segments to determine an optimal number of different appearance attributes.

15. The method of claim 1, wherein values of appearance attributes maximize a minimum perceptual distance in some space of appearance attributes.

16. The method of claim 11, comprising assigning dyslexic pairs to appearance attributes having a maximum perceptual distance in the space of appearance attributes.

* * * * *

UNITED STATES PATENT AND TRADEMARK OFFICE
CERTIFICATE OF CORRECTION

PATENT NO. : 7,607,918 B2  Page 1 of 1
APPLICATION NO. : 11/139279
DATED : October 27, 2009
INVENTOR(S) : Markus Gross It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 857 days.

Signed and Sealed this

Twelfth Day of October, 2010

David J. Kappos
*Director of the United States Patent and Trademark Office*